US011913904B2

United States Patent
Xu et al.

(10) Patent No.: US 11,913,904 B2
(45) Date of Patent: Feb. 27, 2024

(54) REUSABLE CARTRIDGE FOR CAPILLARY ELECTROPHORESIS

(71) Applicant: ProteinSimple, San Jose, CA (US)

(72) Inventors: Hui Xu, Dublin, CA (US); Uyen Nguyen, San Jose, CA (US)

(73) Assignee: ProteinSimple, San Jose, CA (US)

( * ) Notice: Subject to any disclaimer, the term of this patent is extended or adjusted under 35 U.S.C. 154(b) by 270 days.

(21) Appl. No.: 17/385,553

(22) Filed: Jul. 26, 2021

(65) Prior Publication Data

US 2021/0356427 A1    Nov. 18, 2021

Related U.S. Application Data

(63) Continuation of application No. PCT/US2020/015214, filed on Jan. 27, 2020.

(60) Provisional application No. 62/797,110, filed on Jan. 25, 2019.

(51) Int. Cl.
  *G01N 27/447* (2006.01)
  *G01N 27/453* (2006.01)

(52) U.S. Cl.
  CPC .  *G01N 27/44756* (2013.01); *G01N 27/44791* (2013.01)

(58) Field of Classification Search
  CPC ............ G01N 27/44791; G01N 30/60; G01N 30/6004; G01N 30/6091
  See application file for complete search history.

(56) References Cited

U.S. PATENT DOCUMENTS

| 4,088,561 A | 5/1978 | Anderson |
| 5,318,680 A | 6/1994 | Fishman et al. |
| 5,505,831 A | 4/1996 | Liao et al. |
| 5,516,409 A * | 5/1996 | Kambara ......... G01N 27/44782 204/603 |
| 6,083,372 A | 7/2000 | Grover et al. |
| 6,190,616 B1 | 2/2001 | Jovanovich et al. |
| 6,277,259 B1 | 8/2001 | Guttman et al. |
| 6,383,356 B1 * | 5/2002 | Hayashizaki .... G01N 27/44704 204/601 |
| 7,459,069 B2 | 12/2008 | Dorner |

(Continued)

FOREIGN PATENT DOCUMENTS

| CN | 1494654 A | 5/2004 |
| CN | 101389952 A | 3/2009 |

(Continued)

OTHER PUBLICATIONS

EPO machine-generated English language translation of WO 2008075563 A1, WO published Jun. 26, 2008 (Year: 2008).*

(Continued)

*Primary Examiner* — Alexander S Noguerola
(74) *Attorney, Agent, or Firm* — COOLEY LLP (57) ABSTRACT

Embodiments described herein generally relate to cartridges suitable for performing electrophoretic separation of analytes. Cartridges described herein are particularly well suited for reuse. Cartridges described herein can include a reservoir disposed between a capillary and a container containing a run buffer. The reservoir can inhibit run buffer from intruding into the capillary, thereby allowing repeated electrophoretic separations to be more consistent, more accurate, and/or more reliable.

19 Claims, 8 Drawing Sheets

(56) References Cited

U.S. PATENT DOCUMENTS

| | | |
|---|---|---|
| 2002/0123073 A1 | 9/2002 | Amirkhanian et al. |
| 2004/0007465 A1 | 1/2004 | Goldberg et al. |
| 2004/0144652 A1* | 7/2004 | Kasai ..................... B01L 7/00 |
| | | 204/603 |
| 2008/0041724 A1* | 2/2008 | Ozawa ................. G01N 27/447 |
| | | 204/601 |
| 2008/0110757 A1* | 5/2008 | Lee ........................ C07K 1/26 |
| | | 204/453 |
| 2009/0093060 A1 | 4/2009 | Wong et al. |
| 2013/0001084 A1 | 1/2013 | Dolnik |
| 2016/0077053 A1 | 3/2016 | Onuma |
| 2017/0227493 A1* | 8/2017 | Tsai ................. G01N 27/44726 |
| 2018/0202968 A1 | 7/2018 | Singer et al. |
| 2018/0321189 A1 | 11/2018 | Roach et al. |
| 2022/0236221 A1 | 7/2022 | Roach et al. |

FOREIGN PATENT DOCUMENTS

| | | |
|---|---|---|
| CN | 108780061 A | 11/2018 |
| WO | WO-2007121263 A2 | 10/2007 |
| WO | WO-2008075563 A1 | 6/2008 |
| WO | WO-2009005476 A1 | 1/2009 |
| WO | WO-2018156880 A1 | 8/2018 |
| WO | WO-2020154730 A1 | 7/2020 |

OTHER PUBLICATIONS

Extended European Search Report in EP Application No. 20744713.7, dated Sep. 14, 2022, 7 pages.

International Search Report and Written Opinion for Application No. PCT/US2022/018988, dated Jul. 25, 2022, 24 pages.

International Search Report and Written Opinion for International Application No. PCT/US2020/015214, dated Apr. 2, 2020, 14 pages.

Office Action and Search Report for Chinese Application No. CN20208010572 dated Feb. 16, 2023, 15 pages.

Petersson, M., et al., "Miniaturised on-line Solid-phase Extraction for Enhancement of Concentration Sensitivity in Capillary Electrophoresis" Journal of Chromatography A, vol. 841 Issue 2 (May 14, 1999): pp. 249-261.

Takara, "EDTA Buffer Powder," product description, 2021, 1 page, accessed online at https://www.takarabio.com/products/protein-research/sds-page-and-western-blotting/buffers-and-powders/edta-powder.

\* cited by examiner

REUSABLE CARTRIDGE FOR CAPILLARY ELECTROPHORESIS

CROSS REFERENCE TO RELATED APPLICATIONS

This application is a continuation of International Application No. PCT/US2020/015214, filed Jan. 27, 2020 and entitled "Reusable Cartridge for Capillary Electrophoresis," which claims the benefit of priority to U.S. Provisional Patent Application No. 62/797,110, filed Jan. 25, 2019 and entitled "Reusable Cartridge for Capillary Electrophoresis," the entire disclosure of each of which is hereby incorporated by reference.

FIELD

Embodiments described herein generally relate to cartridges suitable for performing electrophoretic separation of analytes. Cartridges described herein are particularly well suited for reuse.

BACKGROUND

A mixture of analytes can be separated based on their different rates of travel in electric fields using electrophoresis. Generally, electrophoresis refers to the movement of suspended or dissolved molecules through a fluid or gel under the action of an electromotive force applied to one or more electrodes or electrically conductive members in contact with the fluid or gel. Some known modes of electrophoretic separation include separating molecules based, at least in part, on differences in their mobilities in a buffer solution (commonly referred to as zone electrophoresis), in a gel or polymer solution (commonly referred to as gel electrophoresis), or in a potential of hydrogen (pH) gradient (commonly referred to as isoelectric focusing). In some instances, biomolecule separation can be carried out in a capillary tube by capillary electrophoresis. U.S. patent application Ser. No. 16/033,808, entitled "System and Methods for Capillary Electrophoresis, Isoelectric Point, and Molecular Weight Analysis," the disclosure of which is hereby incorporated by reference in its entirety, describes various systems, methods, and techniques for carrying out capillary electrophoresis.

A capillary used for electrophoresis is typically filled with a separation medium (e.g., a gel) and fluidically coupled to a reservoir containing a run buffer at each end. During the electrophoresis process, a surface charge at the capillary wall can result in electro-osmotic flow (EOF), which is a bulk fluid motion inside the capillary. Depending on the polarity of the surface charge, the fluid can move in either direction. In instances in which the capillary wall is negatively charged, which may be the case for many capillary electrophoresis applications, the EOF will flow against the direction of the analyte migration. In embodiments in which the analytes migrate from a bottom of a capillary to a top of a capillary, the EOF will typically produce a bulk motion from top (anode) to bottom (cathode) causing top running (anode) buffer to enter the capillary and mix with separation medium. This mixing can modify the separation behavior of the analytes. EOF is unstable due to the variable nature of the surface charge. As a result, the analyte separation will vary over time, particularly if the region where the top running buffer mixes with the separation gel extends to or past a portion of the capillary where analytes are detected. Moreover, if the capillary is reused multiple times, the influx of run buffer can accumulate in the capillary, skewing the results of analytical measurements. For example, peak area may decrease as a capillary is reused. Embodiments described herein relate to capillary cartridges having a reduced susceptibility to run buffer influx.

DETAILED DESCRIPTION

Figure 1:
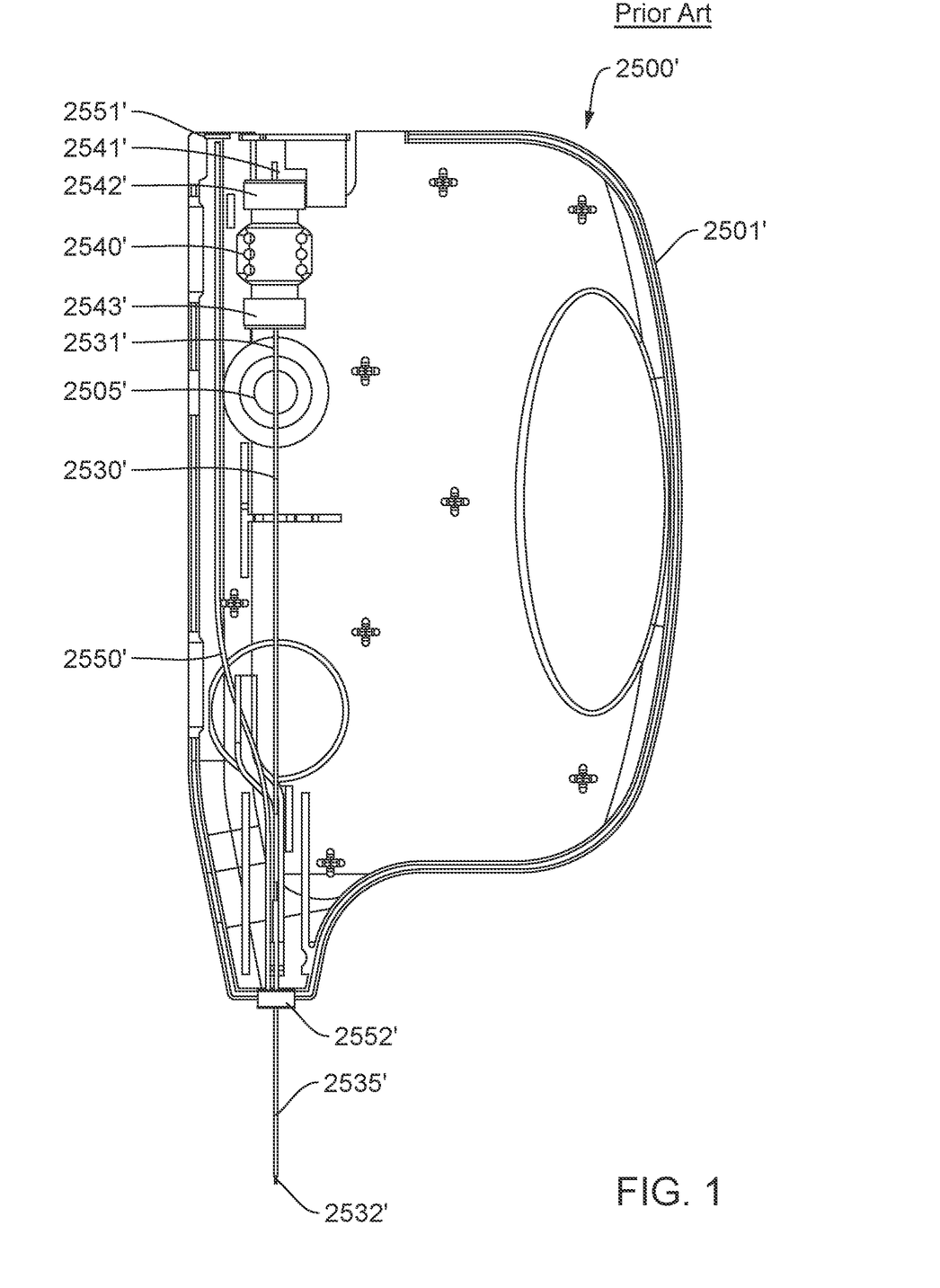
FIG. 1 is a side cut away view cartridge configured for molecular weight analysis, as previously shown and described in U.S. patent application Ser. No. 16/033,808.

FIG. 1 is a side cut away view of a capillary cartridge 2500' suitable for performing electrophoresis. An end portion 2532' of the capillary 2530' is configured to be placed in fluid communication with a sample contained, for example in a sample vial and/or reagent tray (not shown). The capillary 2530' typically contains a gel or other separation medium suitable for separating analytes contained within the sample. The cartridge 2500' and/or an instrument configured to accept the capillary cartridge 2500' can be configured to draw sample and/or analytes into the capillary 2530'. For example, a vial containing the sample can be pressurized, urging the sample into the capillary 2530', the capillary 2530' can be coupled to a vacuum source, the sample can be hydrodynamically injected into the capillary 2530', electrokinetically injected into the capillary 2500', and/or introduced into the capillary using any other suitable means. Electrokinetic injection of the sample may be desirable in instances in which the capillary is reusable.

The capillary cartridge 2500' further includes a dual septa vial 2540' (also referred to herein as a "buffer container") having an inlet septa 2543' and an outlet septa 2542'. The inlet septa 2543' and/or the outlet septa 2542' can be substantially impervious to liquid. The inlet septa 2543' is configured to be pierced by the top end portion 2531' of the capillary 2530' to place the capillary 2530' in fluid communication and electrical communication with an interior volume of the dual septa vial 2540'. For example, the dual septa vial 2540' can contain a run buffer that can be fluidically coupled to the capillary 2530' and/or can receive and store waste samples from the capillary 2530' during a current run or during previous runs.

In some embodiments, the outlet septa 2542' can be gas permeable, such that when the sample is drawn through the capillary 2530' into the dual septa vial 2540', air, but not liquid, can be expelled through the outlet septa 2542'. In addition or alternatively, the dual septa vial 2540' can contain a sponge, filter, and/or other absorbent material to impede the sample from exiting the capillary cartridge 2500'. In this embodiment, the outlet septa 2542' is pierced by the vacuum interface 2541'. In some instances, upon completion of a run, an instrument can be configured to dry the dual septa vial 2540', for example by cycling air through the dual septa vial 2540'. Additionally, in some instances an instrument can be configured to fill or refill the dual septa vial 2540' with run buffer before a run.

An electric potential can be applied to the contents of the capillary 2530' (e.g., the separation medium, sample, and/or analytes) via, the vial 2540' and a portion of the capillary cartridge 2500' and/or a portion of the capillary 2530' to establish an electrical connection therebetween. The electric potential can induce an electromotive force on analytes within the capillary 2530'. In instances in which the analytes are electrically charged, the electric potential can attract the analytes to the end portion 2531' of the capillary 2530' (e.g., toward the dual septa vial 2540'). In some instances, the analytes and/or other portions of the sample can flow toward the end portion of the capillary 2530' with a set of characteristics (e.g., mobility parameters, etc.) based at least in part on molecular weight, wherein analytes with a smaller molecular weight can travel faster than analytes with a larger molecular weight. In other instances, the separation medium can have a pH gradient (e.g., induced by run buffer disposed within the vial 2540') such that analytes can be separated according to their isoelectric points. As discussed above, the electric potential can also cause EOF in the capillary, inducing a bulk flow of separation medium, analytes, and/or run buffer.

Analytes can be detected as they migrate past an aperture 2505' defined by the cartridge body 2501'. For example, a light source can illuminate the capillary 2530' through the aperture 2505' and/or a camera or other optical capture device can detect analytes via induced or native fluorescence, absorbance, or any other suitable means. Analytes can thus be detected as they move past the aperture, and analyte mobility and/or quantity can be identified based on the time to reach the aperture 2505' and/or the strength of the detected signal.

The capillary cartridge 2500' can be configured for reuse. For example, after a separation is performed, another sample can be injected and separated in the capillary 2530', in some instances without flushing and/or replacing the separation medium. Similarly stated, multiple samples can be run through the separation medium. Over many runs, run buffer can intrude into the top portion 2531' of the capillary 2530' and/or movement of a pH gradient can alter the composition of the separation medium, particularly at the top portion 2531' of the capillary. Such buffer intrusion can negatively impact separation performance, cumulatively decreasing detected peak area and/or unpredictably altering detection characteristics. Detection irregularities can be particularly pronounced if and when run buffer reaches the aperture 2505'.

Figure 2:
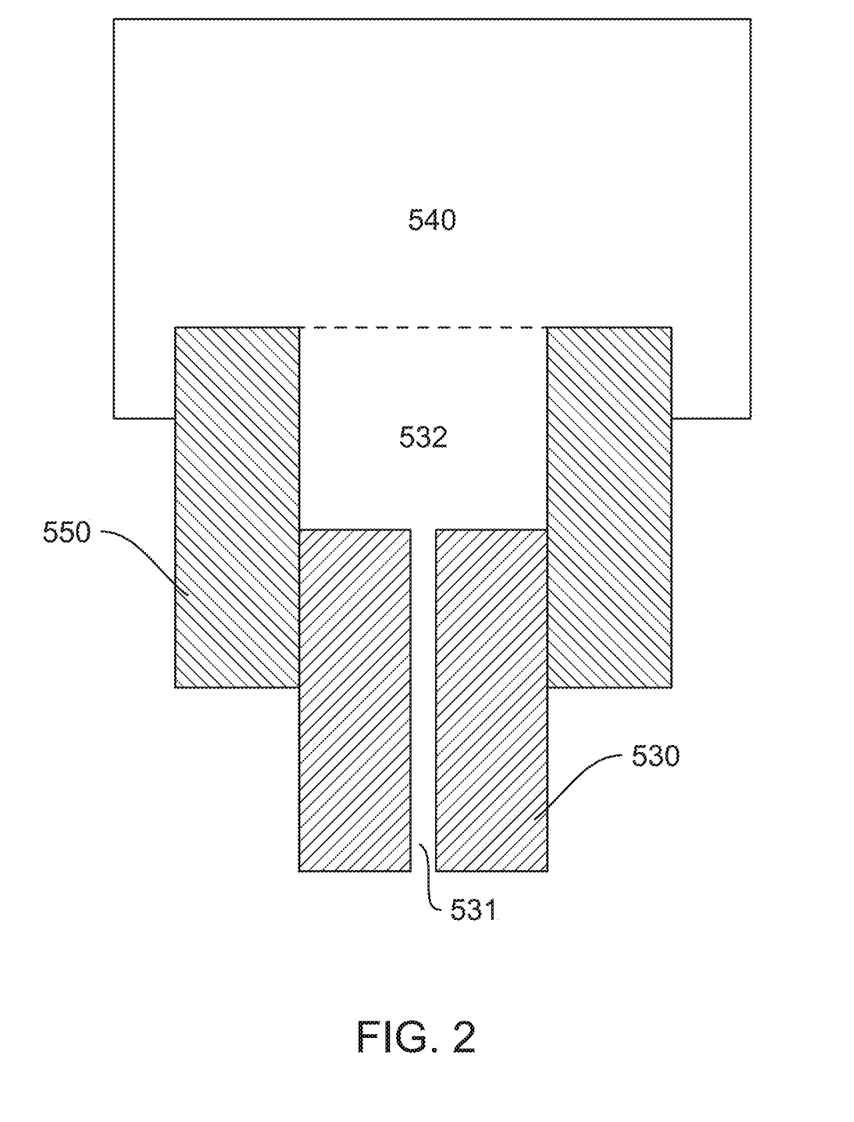
FIG. 2 is a schematic illustration of an end portion of a capillary having a separation gel reservoir, according to an embodiment.

FIG. 2 is a schematic illustration of an end portion of a capillary having a reservoir 532 adapted to contain separation media. As discussed in further detail herein, the reservoir 532 can be formed by affixing a large diameter capillary 550 to capillary 530, which can be adapted for analyte separation. The lumen 531 of the capillary 530 can also be filled with separation media. Reservoir 532 can be fluidically coupled to a buffer container 540, which can be, for example, similar to the dual septa vial 2540' described above and can be filled (or configured to be filled) with run buffer.

In instances in which separation induces EOF, run buffer may infiltrate the reservoir 532 from the buffer container 540. The separation medium may flow from the reservoir 532 into the lumen 531 of the capillary 530, but the separation medium in the reservoir 532 can inhibit the run buffer from reaching the lumen 531 of the capillary 530.

In other embodiments, a buffer container (e.g., a dual septa vial) can contain separation media. Similarly stated, a single reservoir can function as both a separation media reservoir and a run buffer reservoir. It may, however, be preferable to have a distinct buffer container and a distinct separation media reservoir as shown in FIG. 2, as it may be undesirable to have the separation media contact a surface undergoing electrolysis. Additionally electrical current inside the buffer container 540 can be nonuniform such that EOF may cause run buffer to flow past the excess separation media and infiltrate capillary 530. Separating the buffer container 540 (e.g., a dual septa vial) from the separation media reservoir 532 (e.g., formed by a large diameter capillary 550) as shown in FIG. 2 can result in current through the separation medium buffer being relatively uniform and may prevent run buffer from infiltrating capillary 530 until substantially all separation media in reservoir 532 is displaced into the lumen 531 of capillary 530.

Figure 3:
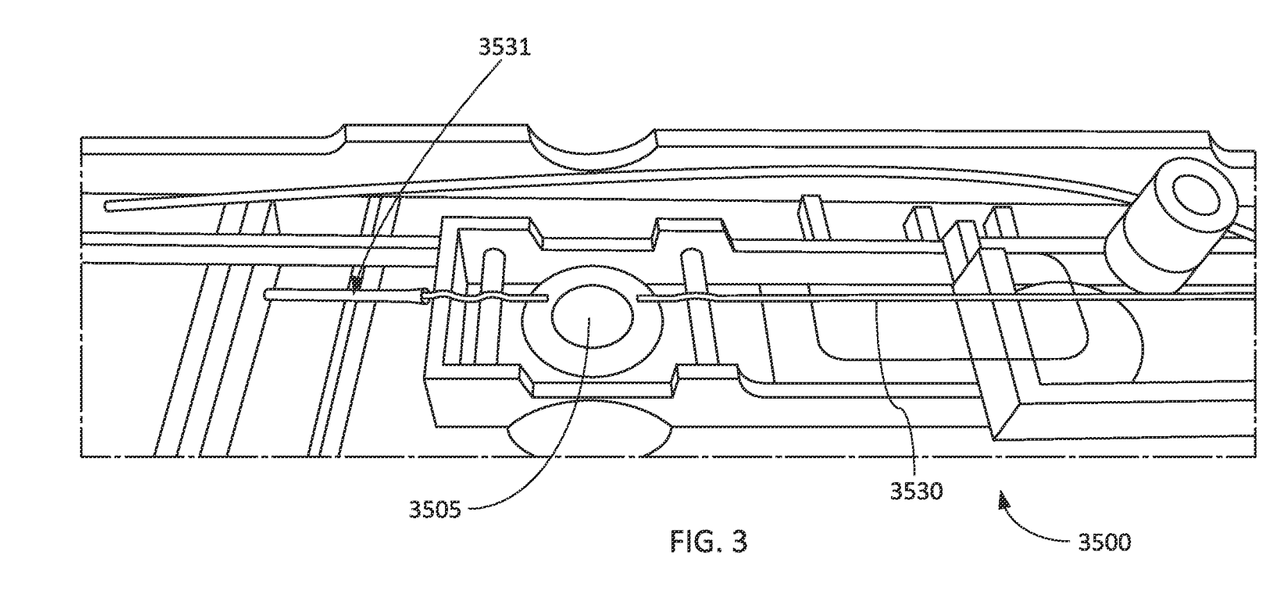
FIG. 3 is a photograph of a cartridge for detecting analytes having an enlarged end portion, according to an embodiment.

FIG. 3 is a photograph of a capillary cartridge 3500, according to an embodiment. Capillary cartridge 3500 is in most respects similar to capillary cartridge 2500' shown and described above with reference to FIG. 1. The top end portion 3531 of the capillary 3530, however, has a larger diameter than the rest of the capillary 3500. For example, the main body of the capillary 3530 can have an inner diameter between 10 microns and 250 microns. The top end portion 3531 of the capillary 3500 can have an internal diameter that is two to ten times the internal diameter of the main body of the capillary 3530. For example, in one instance the main body of the capillary can have an inner diameter of approximately (+/−10%) 100 microns and the top end portion 3531 of the capillary 3500 can have an internal diameter of approximately 300-500 microns. The capillary 3530, including the top portion 3531, can be monolithically formed, or the top portion 3531 can be constructed separately and glued or otherwise affixed to the main body of the capillary 3530.

The top portion 3531 of the capillary can be filled with separation media (e.g., a gel) and can act as a reservoir that can capture run buffer flowing into the capillary 3530 as a result of diffusion, gravity-induced flow, and/or electroosmotic flow. The top portion 3531 can absorb the run buffer or otherwise impede run buffer before it reaches the main body of the capillary 3530, preventing run buffer intrusion from affecting separation performance and/or increasing the longevity of the capillary cartridge 3500 relative to a capillary cartridge having a capillary of a uniform diameter (e.g., capillary cartridge 2500'). In some instances, the top portion 3531 of the capillary can be 2-4 mm long and can contain a volume or separation media equal to or greater than the volume of gel in the length of the main body of the capillary 3530. In this way, the top portion 3531 of the capillary can preferentially supply additional separation media into the main body of the capillary 3530 in the event of electroosmotic flow and inhibit run buffer from reaching the main body of the capillary 3530. Thus, the composition of the separation medium in main body of the capillary 3530 can remain substantially uniform. As a result, the separation behavior of the analytes is more consistent, leading to more repeatable data between injections. Preventing the run buffer intrusions from reaching an aperture 3505 through which analytes can be detected can be particularly beneficial to improving measurement accuracy and reproducibility. In particular, preventing the run buffer from intruding into the capillary will typically result in more consistent and/or accurate peak shape and decreased cumulative reduction of peak height and/or area.

Thus, the inclusion of the larger-diameter top portion 3531 of the capillary 3530 can significantly reduce the tendency towards cumulative decreases in peak area over the course of multiple sample runs, improving the reproducibility and linearity assays performed using the capillary cartridge 3500. The larger-diameter top portion 3531 can further produce more consistent and reproducible separation resolution and/or render the capillary cartridge less sensitive to the changes of composition of run buffer due to evaporation, formulation variation, etc.

Figure 4:
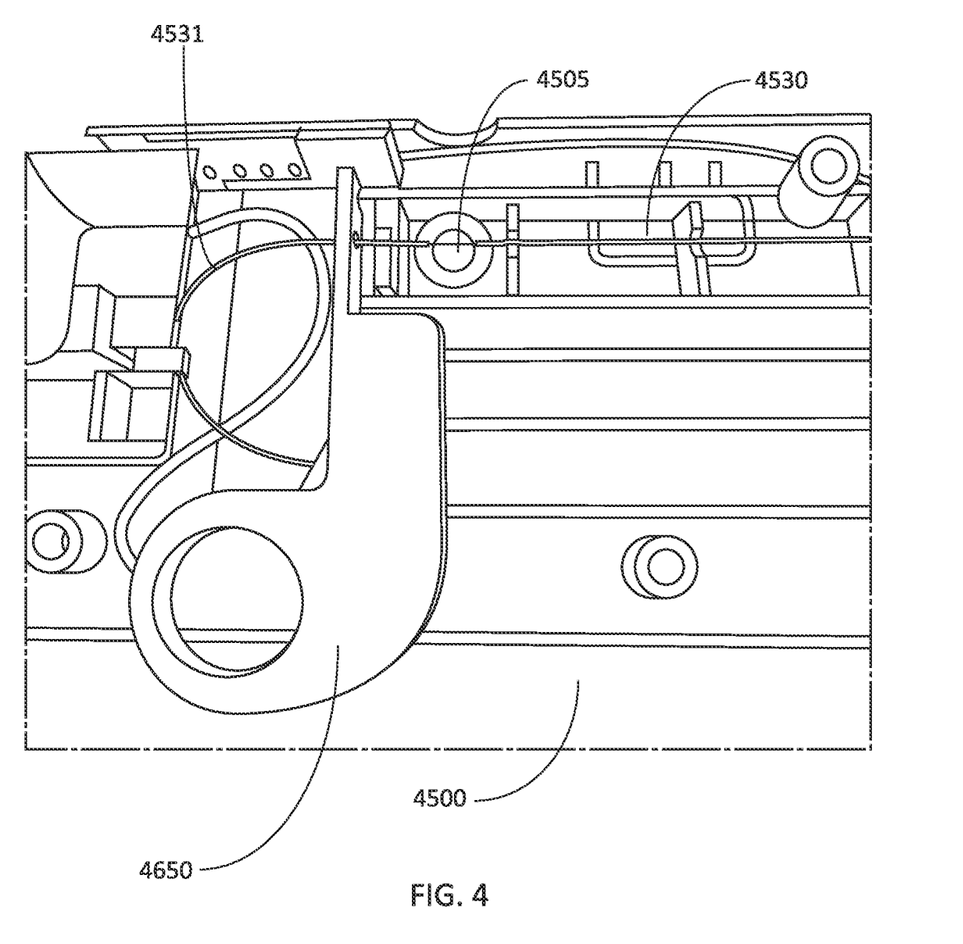
FIG. 4 is a photograph of a cartridge for detecting analytes having an elongated end portion, according to an embodiment.

FIG. 4 is a photograph of a capillary cartridge 4500, according to an embodiment. Capillary cartridge 4500 is in most respects similar to capillary cartridges 2500' and 3500 shown and described above with reference to FIGS. 1 and 3. The capillary 4530 disposed in capillary cartridge 4500, however, has an extended top end portion 4531. Similarly stated, rather than terminating at a vial or other buffer container positioned vertically above the aperture 4505 (e.g., as shown in FIG. 1), the capillary 4530 loops over to a buffer container that is horizontally offset from the aperture 4505. The additional length of capillary column 4530 performs much the same function as the larger-diameter top portion 3531 shown and described above with reference to FIG. 3. For example, 3-10 cm of capillary 4530 can be disposed between the aperture 4505 and an inlet septa, which is hidden behind electrode 4650 in FIG. 4. Specifically, the extended top end portion 4531 provides an additional distance and volume of separation media to absorb any run buffer that intrudes into the capillary 4530. Thus, the top end portion 4531 impedes run buffer from reaching the aperture 4505.

As compared to capillary cartridge 3500, capillary cartridge 4500 may require a higher separation voltage to obtain an equivalent field strength in a separation portion of capillary 5430 due to the increased overall length of the capillary.

Figure 5A:
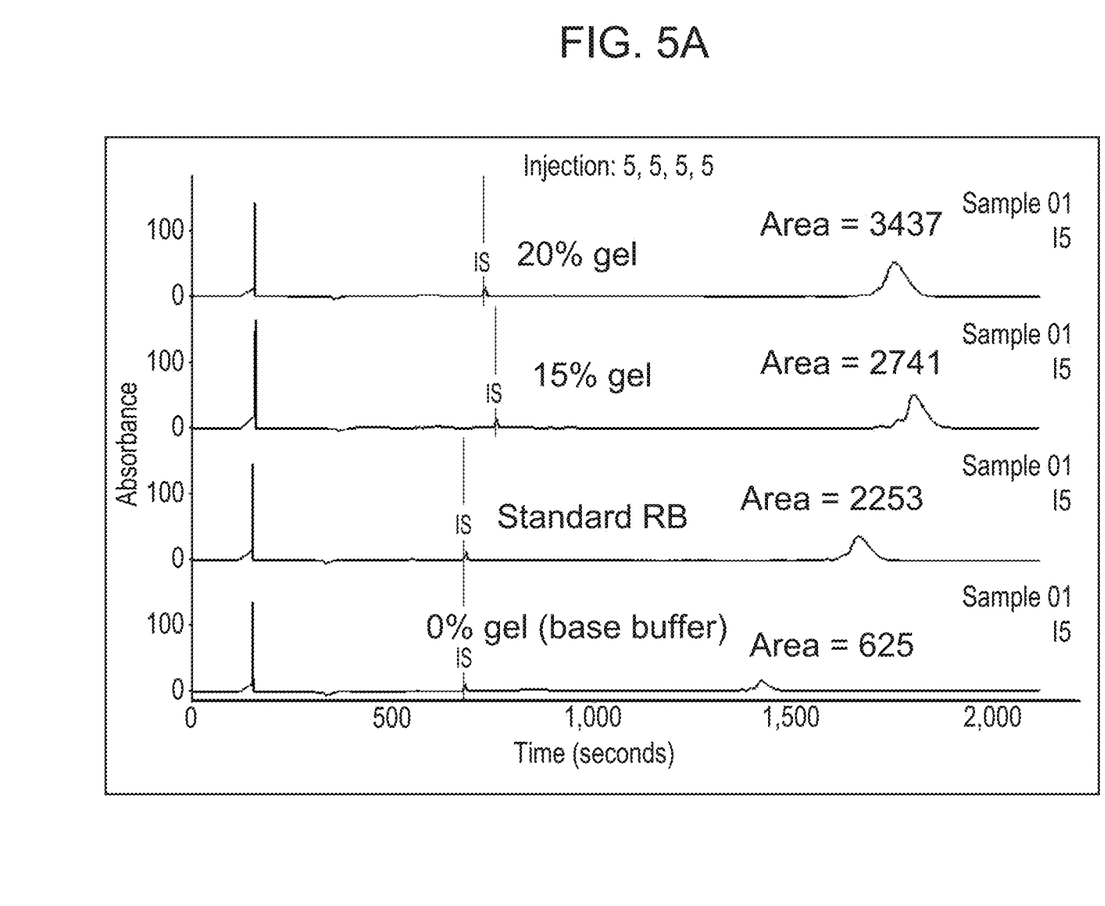
FIG. 5A is a chart showing an assay performed using the cartridge of FIG. 1.
Figure 5B:
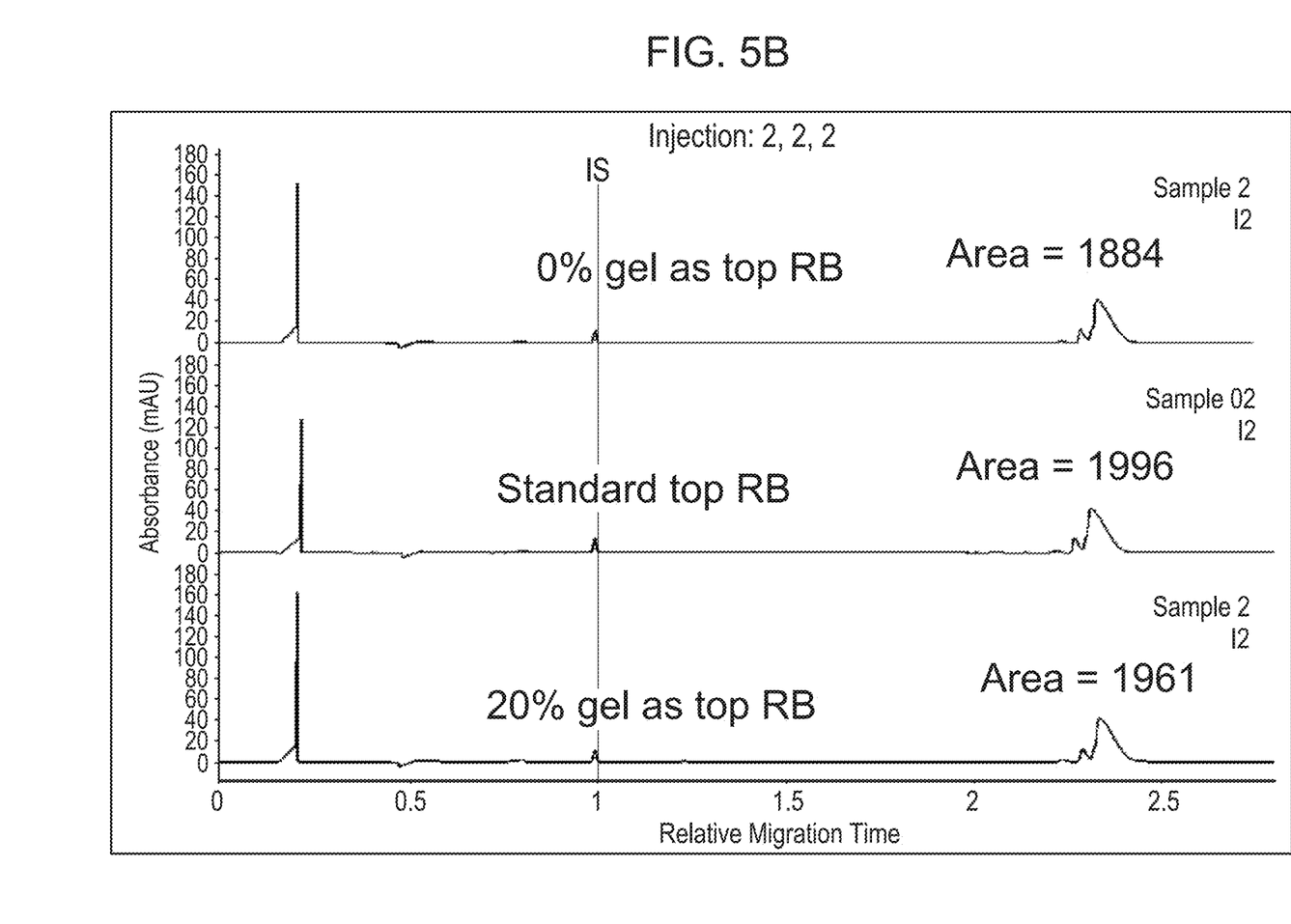
FIG. 5B is a chart showing the same assay performed using a cartridge having a reservoir of separation media (e.g., the cartridge of FIG. 3).

FIG. 5A is a chart showing an assay performed using the cartridge of FIG. 1. FIG. 5B is a chart showing the same assay performed using a cartridge having a reservoir of separation media (e.g., the cartridge of FIG. 3). A comparison of FIGS. 5A and 5B shows that the cartridge of FIG. 1 is sensitive to a change of top running buffer composition while the cartridge of FIG. 3 is more robust against such changes, as demonstrated by the difference in peak area variation. In addition, the separation resolution illustrated in FIG. 5B is consistently higher and independent of the top running buffer compositions.

Figure 6:
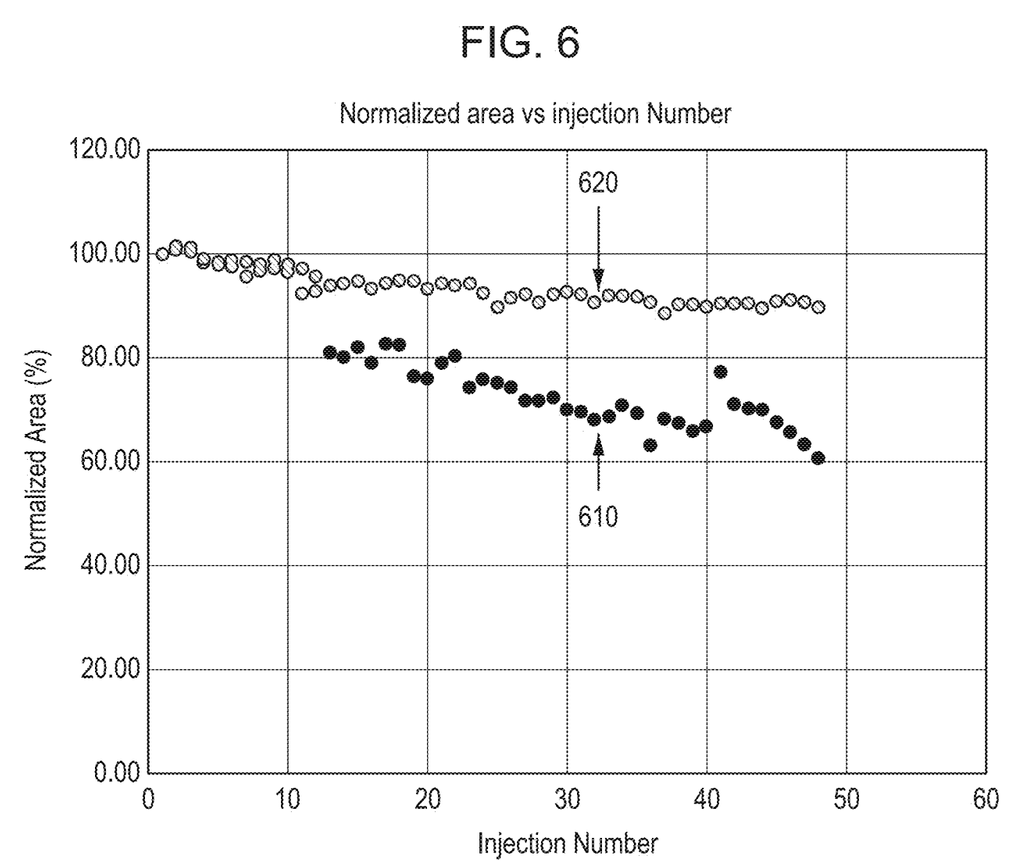
FIG. 6 is a chart comparing a cartridge without a reservoir of separation media to a cartridge with a reservoir of separation media, illustrating improved consistency over multiple separations.

FIG. 6 is a chart comparing a cartridge without a reservoir of separation media 610 (e.g., the cartridge of FIG. 1) to a cartridge with a reservoir of separation media 620 (e.g., the cartridge of FIG. 3), illustrating improved consistency over multiple separations. The data 610 obtained using a cartridge without a reservoir of separation media show a relatively large peak area change over 48 injections while the data 620 obtained using a cartridge with a reservoir of separation media displays a more stable peak area pattern over the same 48 injection conditions.

Figure 7:
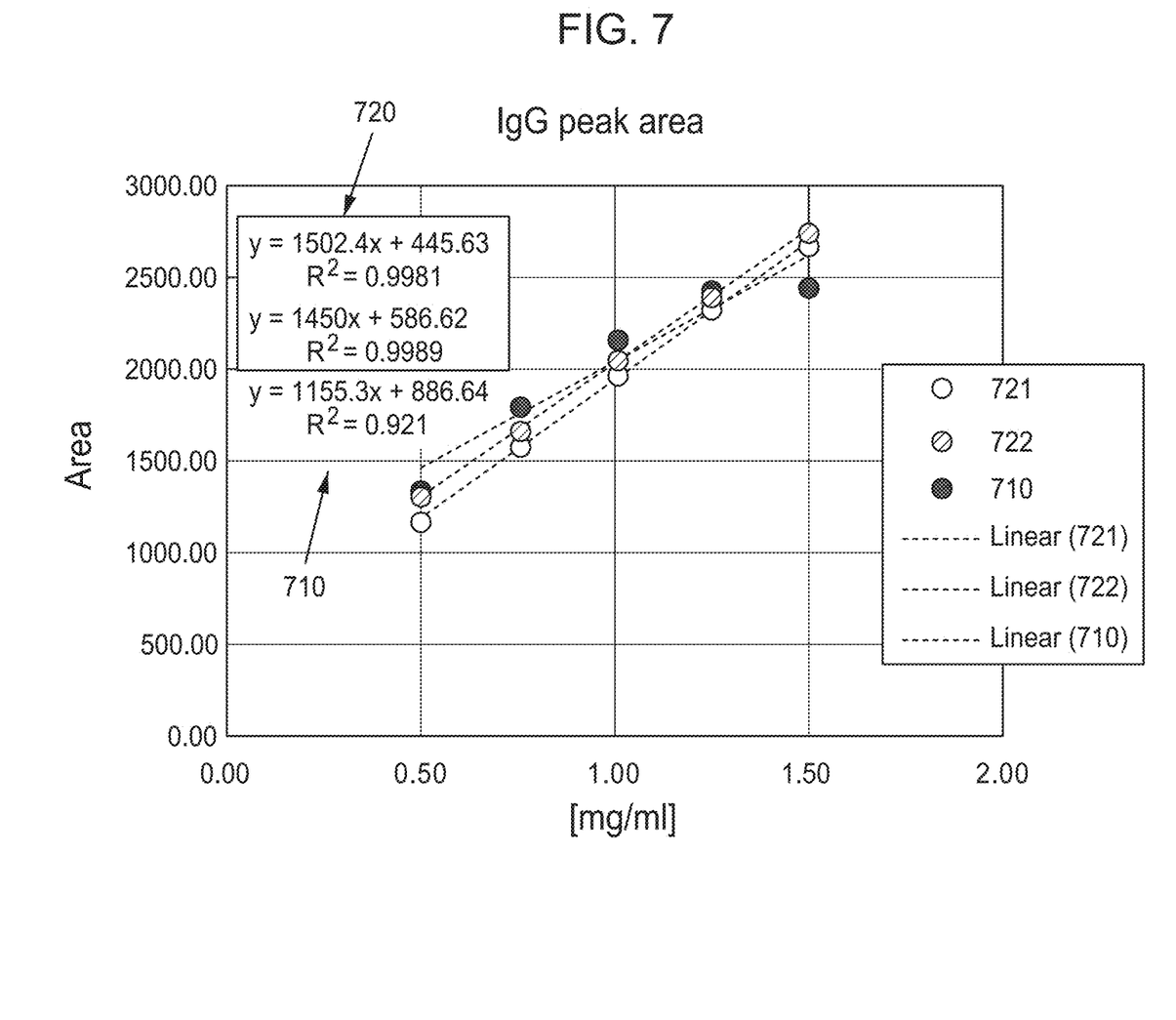
FIG. 7 is chart illustrating a serial sample dilution experiment testing linearity of a system that includes a reservoir of separation media.

FIG. 7 is chart illustrating a serial sample dilution experiment testing linearity of a system that includes a reservoir of separation media (e.g., the cartridge of FIG. 3). Data points 721 and 722 were produced using a cartridge having a reservoir of separation media. The results of data points 721 and 722 are summarized in box 720. Separations 720 using cartridges with separation media reservoirs produced much more linear data than separations using a cartridge without a separation media reservoir 710. The R-squared value for separations 720 produced using cartridges with separation media reservoir is more than 0.99 for both runs, while the separation 710 produced using a cartridge without a separation media reservoir had an R-squared value of 0.921. In summary, the capillary assemblies described herein which include a reservoir adapted to contain separation media minimize the impact of running buffer intrusion on the separation behavior of analytes in the capillary, resulting in better and more consistent separation performance.

While various embodiments have been described above, it should be understood that they have been presented by way of example only, and not limitation. For example, FIG. 1 depicts a dual septa vial 2540', which is described as storing run buffer. It should be understood that run buffer can be fluidically coupled to the capillary by any suitable means. Where schematics and/or embodiments described above indicate certain components arranged in certain orientations or positions, the arrangement of components may be modified. While the embodiments have been particularly shown and described, it will be understood that various changes in form and details may be made. Although various embodiments have been described as having particular features and/or combinations of components, other embodiments are possible having a combination of any features and/or components from any of embodiments as discussed above.

What is claimed is:

1. An apparatus, comprising:
a housing;
a capillary containing a separation medium disposed within the housing;
a buffer container containing run buffer, a first end of the capillary fluidically coupled to the buffer container;
the housing, the capillary, and the buffer container collectively configured to facilitate electrophoretic separation of a sample disposed within the capillary; and
a reservoir disposed between the buffer container and the capillary, the reservoir containing separation medium and having a larger cross-sectional area than the capillary, the reservoir configured to absorb run buffer that migrates from the buffer container during electrophoretic separation of the sample.

2. The apparatus of claim 1, wherein the housing, the capillary, the buffer container, and the reservoir are configured to be reusable such that multiple samples can be electrophoretically separated in the capillary without replacing the separation medium.

3. The apparatus of claim 1, wherein the housing, the capillary, the buffer container, and the reservoir are configured to be reusable such that multiple samples can be electrophoretically separated in the capillary without replacing the run buffer.

4. The apparatus of claim 1, wherein the reservoir has a diameter that is at least three times larger than a diameter of the capillary.

5. The apparatus of claim 1, wherein the separation medium in the reservoir inhibits run buffer contained in the buffer container from reaching the capillary.

6. The apparatus of claim 1, wherein:
the separation medium in the capillary has a pH gradient; and the reservoir is configured to prevent run buffer from reaching the capillary and altering the pH gradient of the separation medium in the capillary.

7. An apparatus, comprising:
a housing;
a capillary containing a separation medium disposed within the housing;
a buffer container vertically disposed above the capillary such that a first end of the capillary is fluidically coupled to the buffer container;
the housing, the capillary, and the buffer container collectively configured to facilitate electrophoretic separation of a sample disposed within the capillary; and
a reservoir disposed between the buffer container and the capillary, the reservoir containing separation medium and having a larger cross-sectional area than the capillary.

8. An apparatus, comprising:
a housing;
a first capillary containing a separation medium disposed within the housing;
a second capillary having a larger diameter than the first capillary, the second capillary being over the first end of the first capillary to form a reservoir containing separation medium; and
a buffer container containing run buffer, the buffer container being coupled to a first end of the second capillary, the housing, the first capillary, and the buffer container collectively configured to facilitate electrophoretic separation of a sample disposed within the first capillary.

9. An apparatus, comprising:
a housing;
a first capillary portion disposed within the housing, the first capillary portion and the housing configured to be vertically oriented, the first capillary portion configured for electrophoretic separation of a sample within the first capillary portion;
a buffer container disposed within the housing and containing run buffer, the buffer container fluidically coupled to the first capillary portion; and
a second capillary portion disposed between the first capillary portion and the buffer container, the second capillary portion configured to inhibit run buffer from reaching the first capillary portion.

10. The apparatus of claim 9, wherein:
the first capillary portion and the second capillary portion are monolithically formed; and
the second capillary portion is non-coaxial with the first capillary portion.

11. The apparatus of claim 9, wherein the first capillary portion and the second capillary portion are separately formed capillaries that are coupled together.

12. The apparatus of claim 9, wherein:
the housing defines an aperture exposing a portion of the first capillary portion;
the second capillary portion is above the portion of the first capillary portion exposed by the aperture; and
the second capillary portion is at least 3 cm long.

13. The apparatus of claim 9, wherein:
the buffer container is disposed above a top of the first capillary portion;
a first end of the second capillary portion is directly coupled to the top of the first capillary portion; and
a second end of the second capillary portion is directly coupled to the buffer container.

14. The apparatus of claim 9, wherein:
the first capillary portion contains a separation medium having a pH gradient; and
the second capillary portion is configured to prevent run buffer from reaching the first capillary portion and altering the pH gradient of the separation medium in the capillary.

15. The apparatus of claim 9, wherein the first capillary portion and the second capillary portion are filled with a separation medium.

16. A method, comprising:
electrophoretically separating, a first sample in a capillary that is vertically oriented in a housing, the capillary containing separation medium, the capillary directly coupled to a reservoir containing separation medium, the reservoir directly coupled to a run buffer container;
electrophoretically separating a second sample in the capillary after the first sample is separated, without replacing separation medium within the capillary.

17. The method of claim 16, further comprising:
electrokinetically injecting the second sample into the capillary after the first sample is separated.

18. The method of claim 16, wherein the reservoir contains separation medium and has a diameter larger than the capillary.

19. The method of claim 16, wherein:
the capillary is a first capillary portion; and
the reservoir is a second capillary portion disposed between the first capillary portion and the run buffer container, the method further comprising:
detecting components of the first sample as they pass an aperture of the housing, the second capillary portion disposed above the aperture of the housing.

* * * * *